United States Patent
Ha et al.

(10) Patent No.: US 8,115,829 B2
(45) Date of Patent: Feb. 14, 2012

(54) APPARATUS AND METHOD FOR CONTROLLING AUTO EXPOSURE

(75) Inventors: Joo Young Ha, Gyunggi-Do (KR); Bong Soon Kang, Busan (KR); Kyung Rin Kim, Busan (KR); Won Tae Choi, Gyunggi-Do (KR); Byung Hoon Kim, Gyunggi-Do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 347 days.

(21) Appl. No.: 12/467,504

(22) Filed: May 18, 2009

(65) Prior Publication Data
US 2010/0097492 A1 Apr. 22, 2010

(30) Foreign Application Priority Data
Oct. 22, 2008 (KR) ........................ 10-2008-0103846

(51) Int. Cl.
H04N 5/238 (2006.01)
H04N 5/243 (2006.01)
(52) U.S. Cl. .................................... 348/230.1
(58) Field of Classification Search ............... 348/229.1, 348/230.1, 255
See application file for complete search history.

(56) References Cited

U.S. PATENT DOCUMENTS

| 7,643,069 B2 * | 1/2010 | Jun ............................ 348/229.1 |
| 2002/0080247 A1 * | 6/2002 | Takahashi et al. ............. 348/229 |
| 2003/0223010 A1 * | 12/2003 | Kaplinsky et al. ............. 348/362 |
| 2010/0134650 A1 * | 6/2010 | Kim et al. .................. 348/229.1 |

FOREIGN PATENT DOCUMENTS

| JP | 02274073 A | * | 11/1990 |
| JP | 05-056333 A |  | 3/1993 |
| KR | 20070044257 A |  | 4/2007 |
| WO | 2007049899 A1 |  | 5/2007 |

OTHER PUBLICATIONS

Korean Office Action for Application No. 10-2008-0103846, mailed Jan. 28, 2010.

* cited by examiner

*Primary Examiner* — Jason Whipkey
(74) *Attorney, Agent, or Firm* — Lowe, Hauptman, Ham & Berner, LLP (57) ABSTRACT

An apparatus and method for controlling auto exposure (AE) that is used in digital imaging devices. The apparatus controlling the luminance of an image being outputted from an image sensor by controlling exposure time and analog gain of the image sensor includes: a luminance operation unit operating and outputting a mean luminance of the image outputted from the image sensor; a shutter index determination unit comparing a predetermined target luminance with the mean luminance of the outputted image and determining a shutter index in different manners according to the magnitude of the difference between the target luminance and the mean luminance of the outputted image; and an exposure time/analog gain determination unit generating exposure time and analog gain corresponding to the shutter index determined in the shutter index determination unit and applying the generated exposure time and analog gain to the image sensor.

18 Claims, 4 Drawing Sheets

APPARATUS AND METHOD FOR CONTROLLING AUTO EXPOSURE

CROSS-REFERENCE TO RELATED APPLICATION

This application claims the priority of Korean Patent Application No. 2008-103846 filed on Oct. 22, 2008, in the Korean Intellectual Property Office, the disclosure of which is incorporated herein by reference.

BACKGROUND OF THE INVENTION

1. Field of the Invention

The present invention relates to a digital image processing technique, and more particularly, to an apparatus and method for controlling auto exposure (AE) that is used in digital imaging devices.

2. Description of the Related Art

In order generate an image having a constant luminance (brightness) regardless the changes in external environments, an auto exposure control apparatus generally applies to a variety of imaging devices requiring digital image processing techniques such as digital still cameras or digital camcorders. An algorithm, which is used to adjust exposure time and analog gain of an image sensor to suitable levels, is applied to this auto exposure control apparatus, wherein the image sensor affects the luminance of images.

An auto exposure control algorithm, which is used in the conventional auto exposure control apparatuses, calculates the luminance of images inputted from an image sensor and controls exposure time and analog gain to suitable levels so that the calculated luminance can approach a predetermined target luminance.

The above-mentioned conventional auto exposure control apparatuses and auto exposure control algorithm have problems in that a flickering phenomenon in which the brightness of images is discontinuously changed or the images repeatedly get bright and dark may be caused when there is a rapid change in external environments, or the intensity of light entering an image sensor is rapidly changed due to the movement of a subject for photography.

Therefore, an apparatus and method for controlling auto exposure, which do not show problems such as the discontinuous changes in brightness and the flickering phenomenon on the image being outputted even when there is the rapid change in environments and the change in the light intensity, are urgently required in the art.

SUMMARY OF THE INVENTION

An aspect of the present invention provides an apparatus and method for controlling auto exposure which do not show problems such as the discontinuous changes in brightness and the flickering phenomenon in the image being outputted even when there is a rapid change in environments and a change in the light intensity.

According to an aspect of the present invention, there is provided an apparatus for controlling auto exposure which controls the luminance of an image being outputted from an image sensor by controlling exposure time and analog gain of the image sensor, including a luminance operation unit operating and outputting a mean luminance of the image outputted from the image sensor; a shutter index determination unit comparing a predetermined target luminance with the mean luminance of the outputted image and determining a shutter index in different manners according to the magnitude of the difference between the target luminance and the mean luminance of the outputted image; and an exposure time/analog gain determination unit generating exposure time and analog gain corresponding to the shutter index determined in the shutter index determination unit and applying the generated exposure time and analog gain to the image sensor.

In this case, the luminance operation unit may divide the image outputted from the image sensor into a plurality of image subsets, and operate the mean luminance of the image outputted from the image sensor from pixels included in the image subsets except for some image subsets disposed in the outskirts thereof among a plurality of the divided image subsets.

Also, the luminance operation unit may operate the mean luminance of the image outputted from the image sensor by using some pixels sampled from the outputted image in a predetermined distance.

In addition, the luminance operation unit may operate a mean luminance of the image outputted from the image sensor by directly using pixel values of pixels in the outputted image, and convert and output the mean luminance by applying nonlinear gain to the mean luminance which is calculated by directly using the pixel values. In this case, the nonlinear gain may be determined so that the mean luminance calculated by directly using the pixel values can be increased when the mean luminance has a lower value than a predetermined reference value, and be determined so that the mean luminance calculated by directly using the pixel values can be decreased when the mean luminance has a higher value than a predetermined reference value.

Additionally, the shutter index determination unit may calculate a difference between the mean luminance outputted from the luminance operation unit and the target luminance by comparing the target luminance with the mean luminance; determine a shutter index, when the magnitude of the difference is within the predetermined range, by adding and subtracting a predetermined unit step to/from the shutter index determined for a previous frame image; and determine a shutter index, when the magnitude of the difference is out of the predetermined range, by adding and subtracting a value, which is obtained by multiplying a predetermined index weight by an error index corresponding to the magnitude of the difference, to/from the shutter index determined for the previous frame image.

Also, the shutter index generation unit may determine a mean luminance index and a target index corresponding respectively to the mean luminance outputted from the luminance operation unit and the target luminance; calculate an error index corresponding to the difference between the mean luminance index and the target index; determine a shutter index, when the magnitude of the difference is within the predetermined range, by adding and subtracting a predetermined unit step to/from a shutter index determined for a previous frame image; and determine a shutter index, when the magnitude of the difference is out of the predetermined range, by adding and subtracting a value, which is obtained by multiplying the index weight by the error index, to/from the shutter index determined for the previous frame image.

In addition, the error index, which is added and subtracted to/from the shutter index determined for the previous frame image when the magnitude of the difference is out of the predetermined range, may be calculated by applying an error weight to the difference between the mean luminance index and the target index, the error weight having a predetermined magnitude according to the mean luminance.

Additionally, the index weight may be increased in magnitude as the difference between the mean luminance outputted from the luminance operation unit and the target luminance decreases.

Furthermore, the exposure time/analog gain generation unit may generate exposure time and analog gain corresponding to the shutter index determined in the shutter index determination unit and apply the generated exposure time and analog gain to the image sensor according to an auto exposure application cycle.

According to another aspect of the present invention, there is provided a method for controlling auto exposure. Here, the method includes: operating a mean luminance of an image outputted from an image sensor; comparing a predetermined target luminance with the calculated mean luminance of the image and determining a shutter index in different manners according to the magnitude of the difference between the target luminance and the mean luminance of the image; and generating exposure time and analog gain corresponding to the determined shutter index and applying the generated exposure time and analog gain to the image sensor.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, exemplary embodiments of the present invention will now be described in detail with reference to the accompanying drawings. However, the description proposed herein is just a preferable example for the purpose of illustrations only, not intended to limit the scope of the invention, so it should be understood that other equivalents and modifications could be made thereto without departing from the spirit and scope of the invention. Also, it should be understood that the detailed description and specific examples, while indicating preferred embodiments of the invention, are given by way of illustration only, since various changes and modifications within the scope of the invention will become apparent to those skilled in the art from this detailed description. Therefore, it is considered that the shapes and dimensions of the parts in the accompanying drawings may be exaggerated for clarity of illustration.

Figure 1:
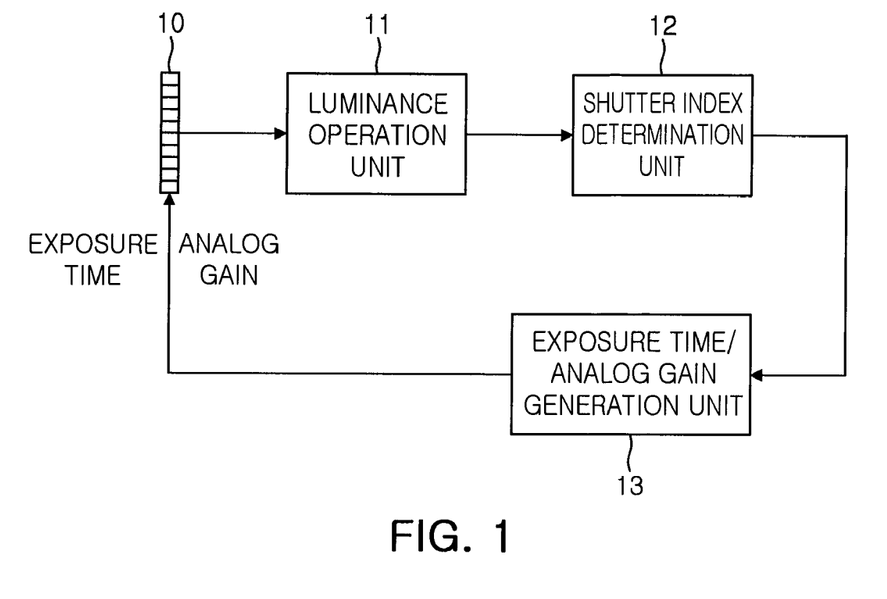
FIG. 1 is a block diagram illustrating an apparatus for controlling auto exposure according to one exemplary embodiment of the present invention.

FIG. 1 is a block diagram illustrating an apparatus for controlling auto exposure according to one exemplary embodiment of the present invention.

Referring to FIG. 1, the apparatus for controlling auto exposure according to one exemplary embodiment of the present invention may include a luminance operation unit 11 operating and outputting a mean luminance of the image outputted from an image sensor 10; a shutter index determination unit 12 comparing a predetermined target luminance with the mean luminance of the outputted image and determining a shutter index in different manners according to the magnitude of the difference between the target luminance and the mean luminance of the outputted image; and an exposure time/analog gain determination unit 13 generating exposure time and analog gain corresponding to the shutter index determined in the shutter index determination unit 12 and applying the generated exposure time and analog gain to the image sensor 10.

Figure 2:
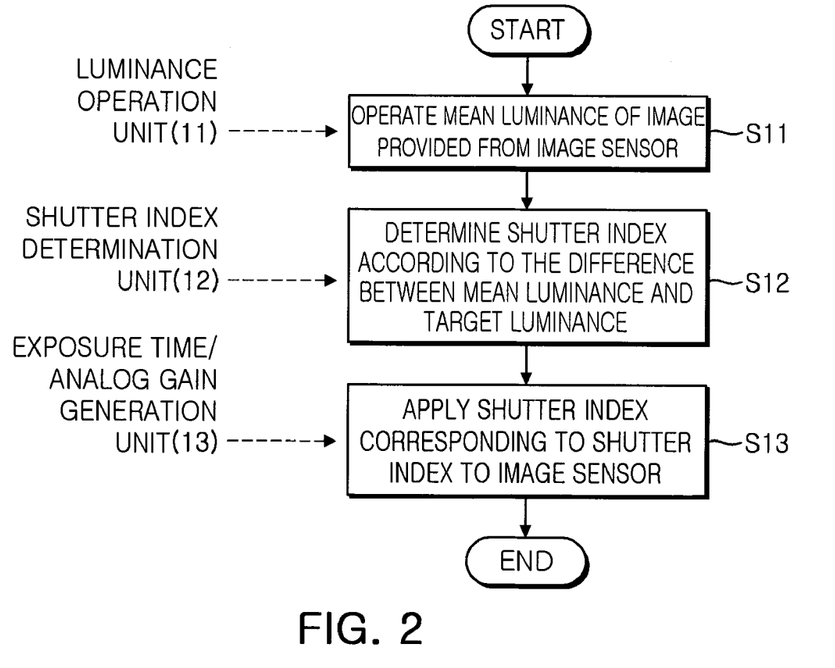
FIG. 2 is a flowchart illustrating a method for controlling auto exposure according to one exemplary embodiment of the present invention.

FIG. 2 is a flowchart illustrating a method for controlling auto exposure according to one exemplary embodiment of the present invention.

Referring to FIG. 2, the method for controlling auto exposure according to one exemplary embodiment of the present invention includes: operating a mean luminance of an image outputted from an image sensor (S11); comparing a predetermined target luminance with the calculated mean luminance of the image and determining a shutter index in different manners according to the magnitude of the difference between the target luminance and the mean luminance of the image (S12); and generating exposure time and analog gain corresponding to the determined shutter index and applying the generated exposure time and analog gain to the image sensor (S13). Operation (S11) may be performed in the above-mentioned luminance operation unit 11, Operation (S12) may be performed in the above-mentioned shutter index determination unit 12, and Operation (S13) may be performed in the exposure time/analog gain generation unit 13.

Figure 3:
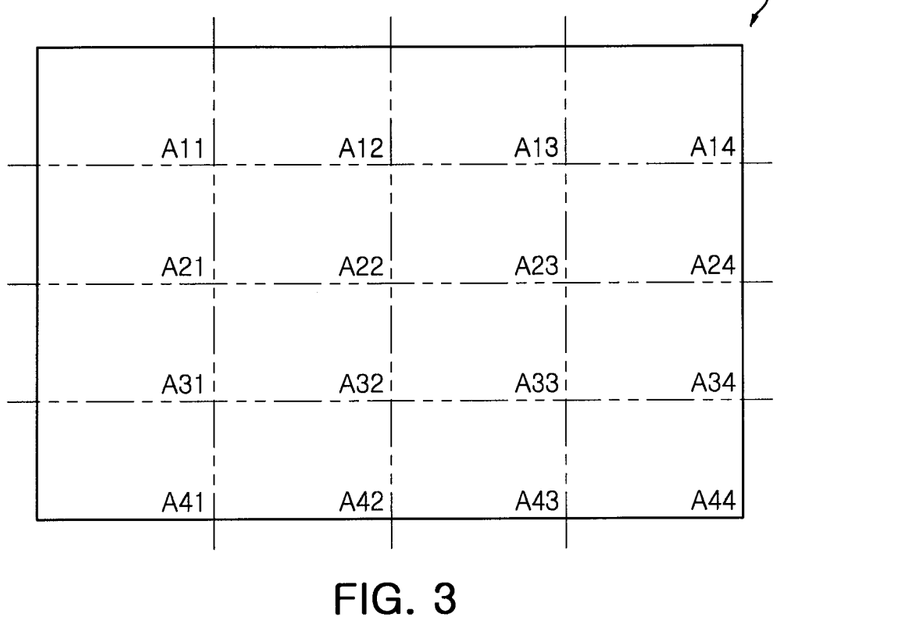
FIG. 3 is a diagram illustrating an image which is divided into a plurality of image subsets to operate the luminance of the image at a luminance operation unit according to one exemplary embodiment of the present invention.
Figure 4:
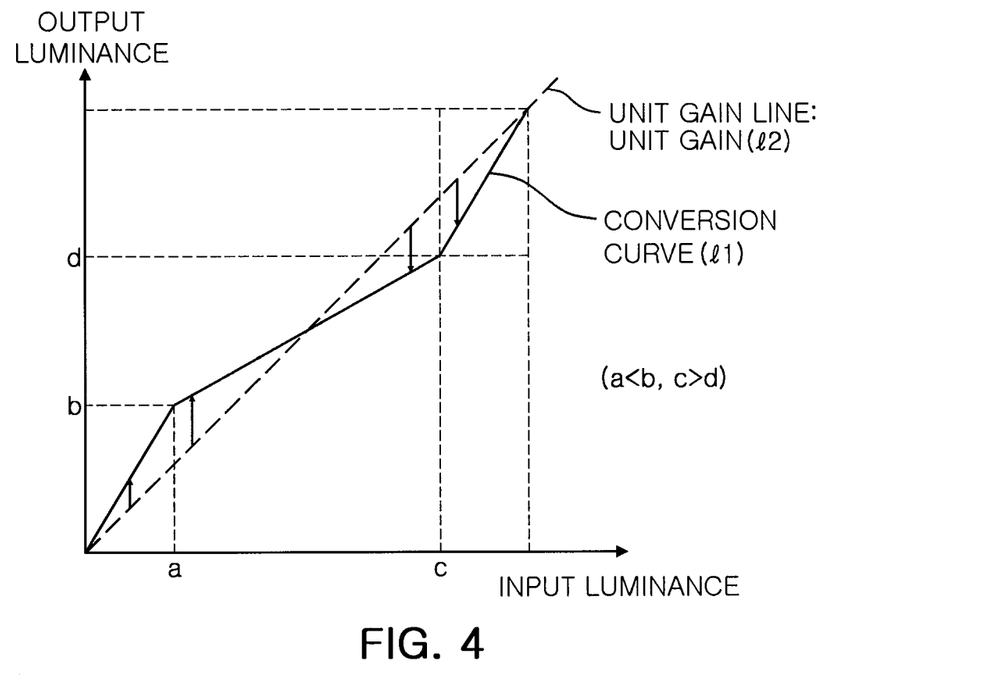
FIG. 4 is a diagram illustrating a nonlinear gain profile which is applied to the mean luminance of an image outputted from a luminance operation unit according to one exemplary embodiment of the present invention.

FIG. 3 is a diagram illustrating an image which is divided into a plurality of image subsets to operate the luminance of the image at a luminance operation unit according to one exemplary embodiment of the present invention, and FIG. 4 is a diagram illustrating a nonlinear gain profile which is applied to the mean luminance of an image outputted from a luminance operation unit according to one exemplary embodiment of the present invention.

Figure 5:
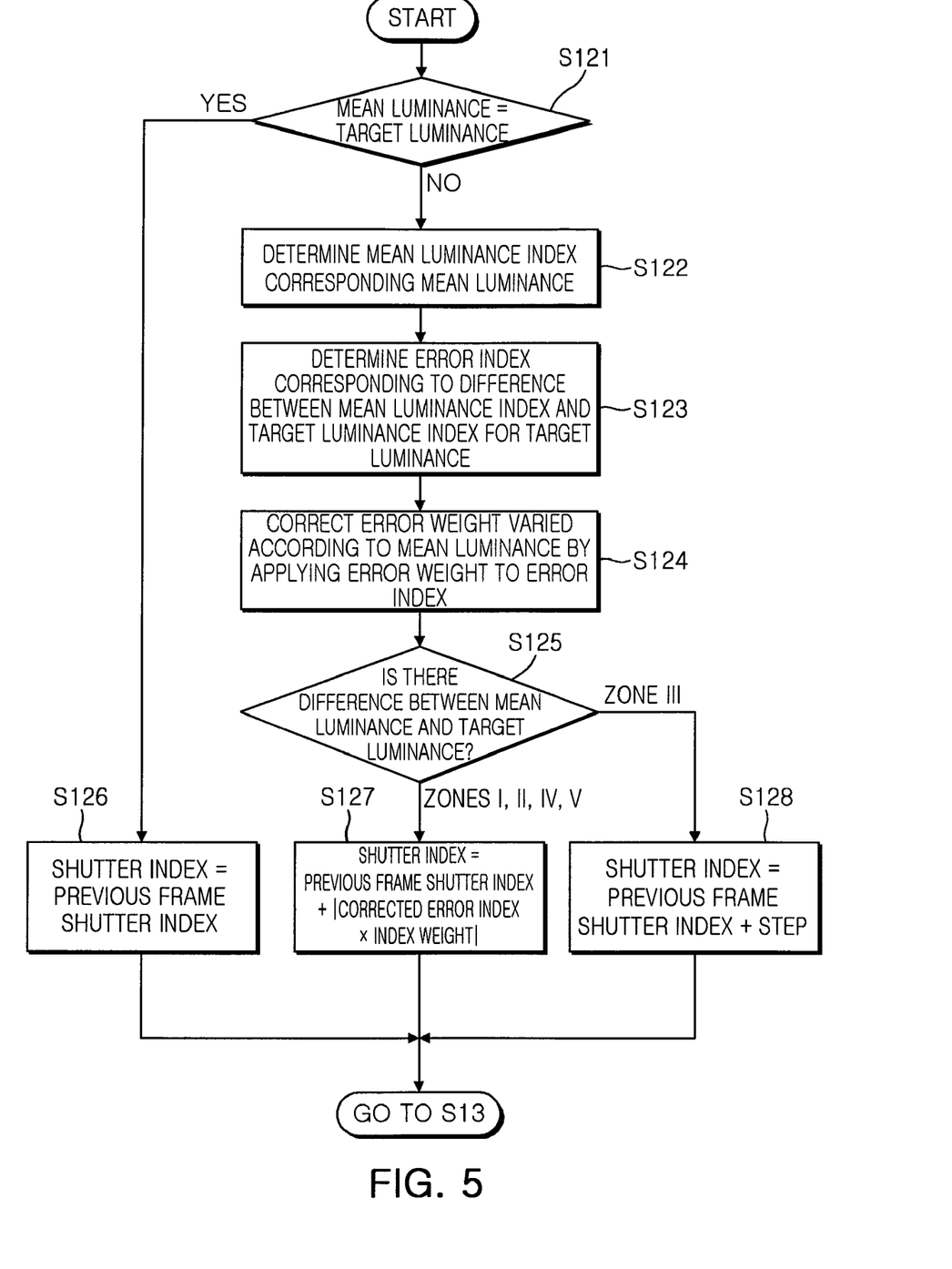
FIG. 5 is a flowchart specifically illustrating Operation of determining a shutter index according to one exemplary embodiment of the present invention.
Figure 6:
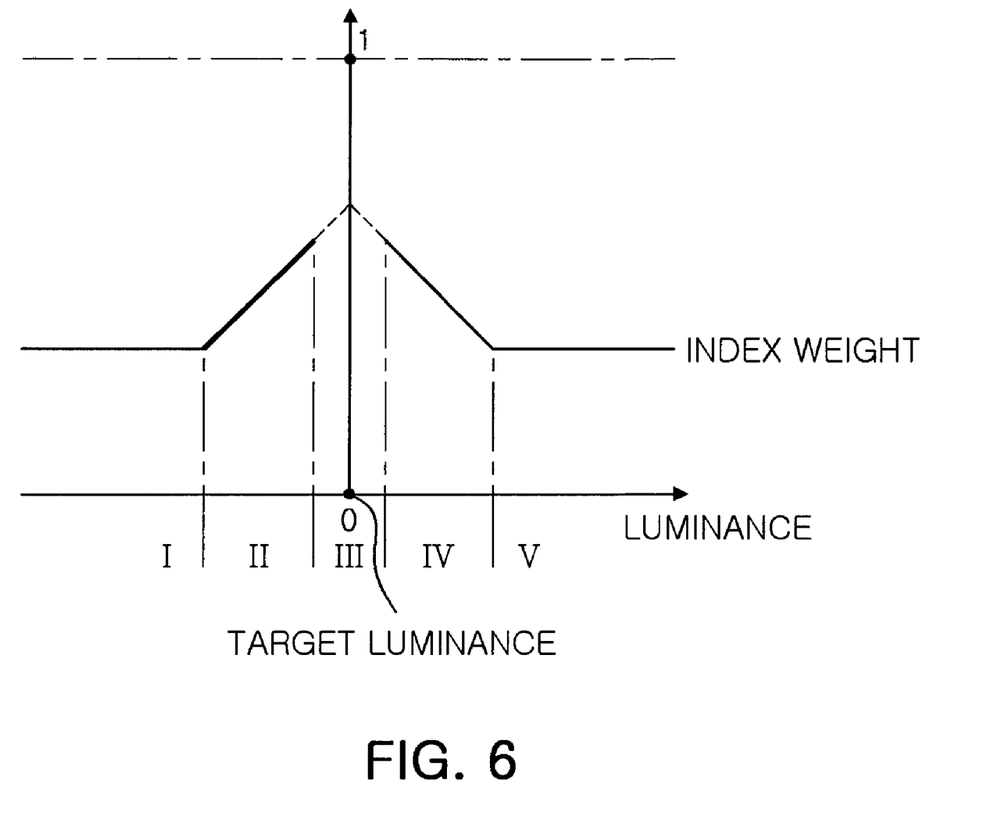
FIG. 6 is a diagram illustrating index weight used in a shutter index determination unit.

Also, FIG. 5 is a flowchart specifically illustrating Operation of determining a shutter index according to one exemplary embodiment of the present invention, and FIG. 6 is a diagram illustrating index weight used in a shutter index determination unit.

Hereinafter, functions and effects of the present invention thus configured are now described in more detail with reference to the accompanying drawings.

A technique of controlling auto exposure according to one exemplary embodiment of the present invention may be initiated when a luminance operation unit 11 receives an image from an image sensor 10.

The image sensor 10 may include an imaging element receiving light and outputting an electrical signal corresponding to the received light; and a shutter adjusting a time when the imaging element is exposed to the light. In general, a CCD or CMOS element may be used as the imaging element, and a mechanic shutter or an electronic shutter may be used as the shutter. The image sensor 10 may determine the luminance of an image outputted from the image sensor 10 by adjusting a time when the imaging element is exposed to light through the shutter, and analog gain used to amplify an electrical signal outputted from the imaging element.

In Operation (S11), the luminance operation unit 11 operates a mean luminance of an image outputted from the image sensor 10, and outputs the calculated mean luminance of the image. In general, the image outputted from the image sensor 10 may be presented in a RGB color space in which each pixel is represented by a RGB value. The luminance operation unit 11 may operates the luminance (Y value in a YCbCR color space) of the image by employing the RGB values of the respective pixels in the image to convert a color space expressed by the image into a YCbCr color space.

Also in Operation (S11), the luminance operation unit 11 may use all pixels distributed in the entire region of the image, or use pixels distributed on some region of the image sensor in order to operate the luminance of the image. In order to use pixels distributed in some region of the image sensor, the luminance operation unit 11 may divide the outputted image into a plurality of image subsets, and operate the mean luminance of the image outputted from the image sensor from the pixels included in the image subsets except for some image subsets disposed in the outskirts thereof among a plurality of the divided image subsets. For example, the luminance operation unit 11 may divide the image 31 inputted from the image sensor into 16 four-by-four image subsets (A11-A44), as shown in FIG. 3, and operate the mean luminance of the inputted image from the pixels distributed in the remaining image subsets except for the image subsets (A11, A14, A41 and A44) disposed in the outskirts thereof among the divided image subsets. Excluding the image subsets (A11, A14, A41 and A44) disposed in the outskirts thereof is why a subject for photography is mainly present in a central region of the generally photo-taken image. That is, when the image subsets disposed in the outskirts thereof are used to operate the mean luminance of the image, it is impossible to control the luminance of the main subject for photography to an adequate level. Therefore, the luminance operation unit 11 may exclude the image subsets disposed in the outskirts thereof in the operation of the mean luminance.

Also in Operation (S11), the luminance operation unit 11 may operate the mean luminance of the image outputted from the image sensor by using some pixels sampled in a predetermined distance from the outputted image. When the image is divided into a plurality of image subsets to operate the mean luminance of the image as described above, the luminance operation unit 11 may sample some pixels among the pixels distributed in the selected image subsets to operate the mean luminance of the image. When some pixels are sampled to operate the mean luminance of the image as described above, the difference in the calculated mean luminance is very small, but the number of operations may be significantly reduced, compared to the method using the entire pixels.

Also in Operation (S11), the luminance operation unit 11 may operate a mean luminance of the image outputted from the image sensor 11 by directly using pixel values of pixels in the outputted image, convert the mean luminance by applying nonlinear gain to the mean luminance which is calculated by directly using the pixel values, and output the converted mean luminance. The mean luminance outputted from the luminance operation unit 11 is compared to the target luminance at the shutter index determination unit 12. In this case, the results of the comparison to the target luminance are critically used to determine a shutter index. The luminance operation unit 11 may operate the mean luminance by using pixel values themselves of the image, convert the mean luminance to an adequate level, and output the converted mean luminance to the shutter index determination unit 12. For example, the luminance operation unit 11 may convert a value outputted by applying nonlinear gain to the mean luminance which is directly calculated by using the pixel values themselves. For example, the nonlinear gain may be determined so that the mean luminance calculated by directly using the pixel values is increased when the mean luminance has a lower value than a predetermined reference value (R), and determined so that the mean luminance calculated by directly using the pixel values is decreased when the mean luminance has a higher value than a predetermined reference value (R), as shown in FIG. 4. That is, a conversion curve 11 providing the nonlinear gain be determined so that it can be positioned above a unit gain line 12 when the mean luminance directly calculated from the pixel values is smaller than the reference value (R), and be determined so that it can be positioned below a unit gain line 12 when the mean luminance directly calculated from the pixel values is higher than the reference value (R), as shown in FIG. 4. From this conversion curve 11, the luminance operation unit 11 may convert the mean luminance (a) into a higher mean luminance (b) and output the converted mean luminance (b) when the mean luminance (a) is smaller than the reference value, and may convert the mean luminance (c) into a smaller mean luminance (d) and output the converted mean luminance (d) when the mean luminance (c) is higher than the reference value. When the mean luminance is compared to the target luminance at the shutter index determination unit 12 after this conversion, a rapid change in luminance that may be caused by the exposure control may be relieved by reducing the difference with the target luminance by a certain level.

Then, after the mean luminance is determined at the luminance operation unit 11 in Operation (S11) as described above, Operation (S12) is initiated.

In Operation (S12), the shutter index determination unit 12 compares a predetermined target luminance with the mean luminance of the image outputted from the luminance operation unit 11, and determines a shutter index in different manners according to the magnitude of the difference between the target luminance and the mean luminance of the outputted image. That is, the shutter index determination unit 12 calculates the difference between the mean luminance and the target luminance, and determines a shutter index in various predetermined manners according to the difference between the mean luminance and the target luminance.

More particularly, In Operation (S12), the shutter index determination unit 12 first of all checks whether the target luminance is identical to the mean luminance outputted from the luminance operation unit 11 (S121), and determines the calculated shutter index of the previous frame as a shutter index of a current frame image when the target luminance is identical to the mean luminance (S126).

When the target luminance is not identical to the mean luminance outputted from the luminance operation unit 11, the shutter index determination unit 12 calculates the difference between the target luminance and the mean luminance outputted from the luminance operation unit by comparing the target luminance with the mean luminance (S125). In this case, when the magnitude of the difference is within the predetermined range, the shutter index determination unit 12 may determine a shutter index by adding and subtracting a predetermined unit step to/from the shutter index determined for a previous frame image (S128). On the contrary, when the magnitude of the difference is out of the predetermined range, the shutter index determination unit 12 may determine a shutter index by adding and subtracting a value, which is obtained by multiplying a predetermined index weight by an error index corresponding to the magnitude of the difference, to/from the shutter index determined for the previous frame image (S127). In this case, in order to compare the target luminance with the mean luminance outputted from the luminance operation unit, the shutter index determination unit 12 may determine a mean luminance index and a target index which correspond respectively to the mean luminance outputted from the luminance operation unit and the target luminance (S122), and calculate an error index corresponding to the difference between the mean luminance index and the target index (S123).

Also in Operation (S12), the shutter index determination unit 12 may calculate the error index, which is added and subtracted to/from the shutter index determined for the previous frame image when the magnitude of the difference is out of the predetermined range, by applying an error weight to the difference between the mean luminance index and the target index, the error weight having a predetermined magnitude according to the mean luminance (S124). As described above, the apparatus for controlling auto exposure according to one exemplary embodiment of the present invention may prevent the sudden change in the shutter index, even when the difference between the mean luminance and the target luminance is high, by applying an adequate error weight to the value calculated from the difference the mean luminance and the target luminance, depending on the magnitude of the difference.

Meanwhile, when the magnitude of the difference is out of the predetermined range, the index weight used in Operation (S127) of determining a shutter index may be increased in magnitude as the difference between the mean luminance outputted from the luminance operation unit and the target luminance decreases. One example of the index weight is shown in FIG. 6. As shown in FIG. 6, the index weight is decreased in magnitude as the difference between the mean luminance and the target luminance increases gradually, but may be maintained to a nearly constant level when the magnitude of the difference is out of the predetermined range. The index weight as shown in FIG. 6 may be divided into Zones I and V (high difference between the target luminance and the mean luminance) having a nearly constant index weight, Zones II and IV having a gradually increasing index weight as the difference between the target luminance and the mean luminance decreases, and Zone III. In particular, the Zone III may be set to a zone in which the auto exposure should be more precisely controlled due to the very small difference between the target luminance and the mean luminance. The index weight used in Operation (S127) may include index weights belonging to the Zones I, II, IV and V as shown in FIG. 6. FIG. As shown in FIG. 6. FIG, a relatively lower index weight is used as the index weight to avoid the sudden change in luminance when there is the high difference between the mean luminance and the target luminance, and an index weight that gradually increases as the difference between the mean luminance and the target luminance decreases may be used as the index weight. Also, when the difference between the mean luminance and the target luminance is within the predetermined range but very small, the shutter index is precisely controlled, as described above, by varying the shutter index to a level as much as the predetermined unit step (S128).

Then, in Operation (S13), the exposure time/analog gain generation unit 13 may generate exposure time and analog gain corresponding to the shutter index determined in the shutter index determination unit and apply the generated exposure time and analog gain to the image sensor. In this case, the exposure time/analog gain generation unit 13 may generate exposure time and analog gain corresponding to the shutter index determined in the shutter index determination unit 12, and apply the generated exposure time and analog gain to the image sensor according to an auto exposure application cycle. That is, in accordance with one exemplary embodiment of the present invention, the exposure time/analog gain generation unit 13 may apply new exposure time/analog gain to every frame inputted from the image sensor 10. In accordance with another exemplary embodiment of the present invention, the exposure time/analog gain generation unit 13 may apply the calculated exposure time/analog gain to every frame once, for example once to Frame 2, or once to Frame 3. As described above, the apparatus for controlling auto exposure according to one exemplary embodiment of the present invention may prevent the sudden change in the luminance of images, which may be caused during the exposure control to apply the auto exposure to all the frames, by previously determining the auto exposure application cycle to a suitable level.

In accordance with the present invention, the number of operations, which are performed for the control of the auto exposure, may be reduced. Also in accordance with the present invention, the sudden change in the luminance of the image in the application of the auto exposure may be prevented by applying the mean luminance calculated from the image to the nonlinear gain and reducing the target gain and variations, for example, decreasing a high gain and increasing a low gain. Furthermore, in accordance with the present invention, the sudden change in the luminance of the image in the application of the auto exposure may be prevented by applying the index weight according to the magnitude of the mean luminance of the image to the difference between the mean luminance of the image and the target luminance and employing the index weight according to the difference between the mean luminance of the image and the target luminance to determine a shutter index. Therefore, it is possible to stably reproduce an image with an adequate luminance even when there in the sudden change in the brightness of the subject for photography.

While the present invention has been shown and described in connection with the exemplary embodiments, it will be apparent to those skilled in the art that modifications and variations can be made without departing from the scope of the invention. Therefore, the description proposed herein is just a preferable example for the purpose of illustrations only, not intended to limit the scope of the invention, so it should be understood that other equivalents and modifications could be made thereto as defined in the appended claims.

What is claimed is:

1. An apparatus for controlling auto exposure which controls the luminance of an image being outputted from an image sensor by controlling exposure time and analog gain of the image sensor, comprising:
   a luminance operation unit operating and outputting a mean luminance of the image outputted from the image sensor;
   a shutter index determination unit comparing a predetermined target luminance with the mean luminance of the outputted image and determining a shutter index in different manners according to the magnitude of the difference between the target luminance and the mean luminance of the outputted image; and
   an exposure time/analog gain determination unit generating exposure time and analog gain corresponding to the shutter index determined in the shutter index determination unit and applying the generated exposure time and analog gain to the image sensor, wherein the luminance operation unit operates a mean luminance of the image outputted from the image sensor by directly using pixel values of pixels in the outputted image, and converts and outputs the mean luminance by applying nonlinear gain to the mean luminance which is calculated by directly using the pixel values.

2. The apparatus of claim 1, wherein the nonlinear gain is determined so that the mean luminance calculated by directly using the pixel values is increased when the mean luminance has a lower value than a predetermined reference value, and determined so that the mean luminance calculated by directly using the pixel values is decreased when the mean luminance has a higher value than a predetermined reference value.

3. The apparatus of claim 1, wherein the exposure time/analog gain determination unit generates exposure time and analog gain corresponding to the shutter index determined in the shutter index determination unit and applies the generated exposure time and analog gain to the image sensor according to an auto exposure application cycle.

4. An apparatus for controlling auto exposure which controls the luminance of an image being outputted from an image sensor by controlling exposure time and analog gain of the image sensor, comprising:
a luminance operation unit operating and outputting a mean luminance of the image outputted from the image sensor;
a shutter index determination unit comparing a predetermined target luminance with the mean luminance of the outputted image and determining a shutter index in different manners according to the magnitude of the difference between the target luminance and the mean luminance of the outputted image; and
an exposure time/analog gain determination unit generating exposure time and analog gain corresponding to the shutter index determined in the shutter index determination unit and applying the generated exposure time and analog gain to the image sensor,
wherein the shutter index determination unit:
calculates a difference between the mean luminance outputted from the luminance operation unit and the target luminance by comparing the target luminance with the mean luminance;
determines a shutter index, when the magnitude of the difference is within the predetermined range, by adding and subtracting a predetermined unit step to/from the shutter index determined for a previous frame image; and
determines a shutter index, when the magnitude of the difference is out of a predetermined range, by adding and subtracting a value, which is obtained by multiplying a predetermined index weight by an error index corresponding to the magnitude of the difference, to/from the shutter index determined for the previous frame image.

5. The apparatus of claim 4, wherein the shutter index generation unit:
determines a mean luminance index and a target index corresponding respectively to the mean luminance outputted from the luminance operation unit and the target luminance;
calculates an error index corresponding to the difference between the mean luminance index and the target index;
determines a shutter index, when the magnitude of the difference is within the predetermined range, by adding and subtracting a predetermined unit step to/from a shutter index determined for a previous frame image; and determines a shutter index, when the magnitude of the difference is out of the predetermined range, by adding and subtracting a value, which is obtained by multiplying the index weight by the error index, to/from the shutter index determined for the previous frame image.

6. The apparatus of claim 5, wherein the error index, which is added and subtracted to/from the shutter index determined for the previous frame image when the magnitude of the difference is out of the predetermined range, is calculated by applying an error weight to the difference between the mean luminance index and the target index, the error weight having a predetermined magnitude according to the mean luminance.

7. The apparatus of claim 4, wherein the index weight is increased in magnitude as the difference between the mean luminance outputted from the luminance operation unit and the target luminance decreases.

8. The apparatus of claim 4, wherein the exposure time/analog gain determination unit generates exposure time and analog gain corresponding to the shutter index determined in the shutter index determination unit and applies the generated exposure time and analog gain to the image sensor according to an auto exposure application cycle.

9. A method for controlling auto exposure, comprising:
operating a mean luminance of an image outputted from an image sensor;
comparing a predetermined target luminance with the calculated mean luminance of the image and determining a shutter index in different manners according to the magnitude of the difference between the target luminance and the mean luminance of the image; and
generating exposure time and analog gain corresponding to the determined shutter index and applying the generated exposure time and analog gain to the image sensor,
wherein the operation of operating a mean luminance of an image comprises:
operating a mean luminance by using some pixels uniformly distributed on the image outputted from the image sensor.

10. The method of claim 9, wherein the operation of applying the generated exposure time and analog gain to the image sensor comprises:
applying the generated exposure time and analog gain to the image sensor according to an auto exposure application cycle.

11. A method for controlling auto exposure, comprising:
operating a mean luminance of an image outputted from an image sensor;
comparing a predetermined target luminance with the calculated mean luminance of the image and determining a shutter index in different manners according to the magnitude of the difference between the target luminance and the mean luminance of the image; and
generating exposure time and analog gain corresponding to the determined shutter index and applying the generated exposure time and analog gain to the image sensor,
wherein the operation of operating a mean luminance of an image comprises:
operating a mean luminance by directly using pixel values of pixels included in the image outputted from the image sensor; and
operating a mean luminance which is converted by applying nonlinear gain to the mean luminance calculated by directly using the pixel values.

12. The method of claim 11, wherein the nonlinear gain is determined so that the mean luminance calculated by directly using the pixel values is increased when the mean luminance has a lower value than a predetermined reference value, and determined so that the mean luminance calculated by directly using the pixel values is decreased when the mean luminance has a higher value than a predetermined reference value.

13. The method of claim 11, wherein the operation of applying the generated exposure time and analog gain to the image sensor comprises:
applying the generated exposure time and analog gain to the image sensor according to an auto exposure application cycle.

14. A method for controlling auto exposure, comprising:
operating a mean luminance of an image outputted from an image sensor;
comparing a predetermined target luminance with the calculated mean luminance of the image and determining a shutter index in different manners according to the magnitude of the difference between the target luminance and the mean luminance of the image; and
generating exposure time and analog gain corresponding to the determined shutter index and applying the generated exposure time and analog gain to the image sensor,
wherein the operation of determining a shutter index comprises:
calculating a difference between the mean luminance, which is calculated in the operation of operating a mean luminance, and the target luminance by comparing the target luminance with the mean luminance;
determining a shutter index, when the magnitude of the difference is within a predetermined range, by adding and subtracting a predetermined unit step to/from a shutter index determined for a previous frame image; and
determining a shutter index, when the magnitude of the difference is out of the predetermined range, by adding and subtracting a value, which is obtained by multiplying a predetermined index weight by an error index corresponding to the magnitude of the difference, to/from the shutter index determined for the previous frame image.

15. The method of claim 14, wherein the operation of determining a shutter index comprises:
determining a mean luminance index and a target index corresponding respectively to the mean luminance, which is calculated in the operation of operating a mean luminance, and the target luminance;
calculating an error index corresponding to the difference between the mean luminance index and the target index;
determining a shutter index, when the magnitude of the difference is within the predetermined range, by adding and subtracting a predetermined unit step to/from a shutter index determined for a previous frame image; and
determining a shutter index, when the magnitude of the difference is out of the predetermined range, by adding and subtracting a value, which is obtained by multiplying the index weight by the error index, to/from the shutter index determined for the previous frame image.

16. The method of claim 15, wherein the error index, which is added and subtracted to/from the shutter index determined for the previous frame image when the magnitude of the difference is out of the predetermined range, is calculated by applying an error weight to the difference between the mean luminance index and the target index, the error weight having a predetermined magnitude according to the mean luminance.

17. The method of claim 14, wherein the index weight is increased in magnitude as the difference between the mean luminance outputted from the luminance operation unit and the target luminance decreases.

18. The method of claim 14, wherein the operation of applying the generated exposure time and analog gain to the image sensor comprises:
applying the generated exposure time and analog gain to the image sensor according to an auto exposure application cycle.

* * * * *